United States Patent [19]

Freelain

[11] Patent Number: 5,217,324
[45] Date of Patent: Jun. 8, 1993

[54] DYNAMIC BREAKWATER AND PUMPING SYSTEM

[76] Inventor: Kenneth W. Freelain, 1630-A Beekman Pl., NW., Washington, D.C. 20009

[21] Appl. No.: 986,552

[22] Filed: Dec. 7, 1992

Related U.S. Application Data

[63] Continuation-in-part of Ser. No. 731,271, Jul. 17, 1991, abandoned.

[51] Int. Cl.$^5$ .............................................. E02B 9/08
[52] U.S. Cl. ...................................... 405/76; 405/75; 405/21; 417/536
[58] Field of Search .................................. 405/75–78, 405/52, 21–25; 417/330, 536

[56] References Cited

U.S. PATENT DOCUMENTS

| | | | |
|---|---|---|---|
| 51,653 | 12/1865 | Hardick | 417/536 |
| 156,839 | 11/1874 | Dale et al. | 417/536 |
| 241,455 | 5/1881 | Yerniaud | 417/536 X |
| 257,473 | 5/1882 | Cloud | 417/536 |
| 1,008,682 | 11/1911 | Wall | 417/330 |
| 1,073,214 | 9/1913 | Carr | 417/330 |
| 1,077,509 | 11/1913 | Bemis | 417/330 |
| 1,097,073 | 5/1914 | Bemis | 417/330 |
| 1,439,984 | 12/1922 | Talbert | 417/330 |
| 2,278,818 | 4/1942 | Zoppa | 417/330 |
| 3,151,564 | 10/1964 | Rosenberg | 417/330 |
| 3,389,888 | 6/1968 | Edwards | 417/330 X |
| 4,132,901 | 1/1979 | Crausbay | 417/330 X |
| 4,613,287 | 9/1986 | Hambley | 417/330 |

*Primary Examiner*—Dennis L. Taylor

[57] ABSTRACT

A dynamic breakwater system pumps water from a body of water in response to wave action or underwater currents. A submerged stationary base is fixed to a solid subsurface. A breakwater protrudes upwardly through the surface of the water. Wheels support the breakwater for displacement on the base along a generally horizontal displacement axis. Springs acting against opposing sides of the breakwater urge it to a rest position between two horizontally extreme positions, and wave action and underwater currents against either side of the breakwater produce a reciprocating movement of the breakwater along its displacement axis. A pump pumps water in response to the reciprocating movement. The pump has a large piston spaced from the pump housing by roller assemblies. A door permits access to the pump interior for removal of debris or for repair, and a locking mechanism fixes the breakwater to the base to arrest pumping action for such purposes. Brush assemblies attached to the breakwater sweep debris from the base in response to the reciprocating motion ensuring that the breakwater continues to displace.

17 Claims, 3 Drawing Sheets

DYNAMIC BREAKWATER AND PUMPING SYSTEM

CROSS-REFERENCE TO RELATED APPLICATION

This is a continuation-in-part of U.S. patent application Ser. No. 731,271 filed on Jul. 17, 1991, now abandoned.

FIELD OF THE INVENTION

The invention relates generally to converting movement of a body of water, such as a lake or ocean, into alternative forms of kinetic, potential, or electrical energy. More particularly, the invention relates to a dynamic breakwater and to a pumping mechanism responsive to motion of the breakwater.

DESCRIPTION OF THE PRIOR ART

A breakwater is commonly used to protect a harbor or shoreline against rough waters, soil erosion and accumulation of debris. Breakwaters have traditionally been large stationary structures fixed to a lake or ocean bottom. To the knowledge of the inventor, none has been adapted to perform more than such basic protective functions.

A number of systems have been proposed to pump water or produce energy in response to motion of a body of water. U.S. Pat. No. 4,403,154 to Reale et al describes apparatus for generating electricity. U.S. Pat. No. 4,754,157 to Windle, U.S. Pat. No. 4,563,591 to Jones, U.S. Pat. No. 4,742,241 to Melvin, and U.S. Pat. No. 4,495,765 to French all teach float-type devices for converting wave action into pumping action or other useful forms of energy. U.S. Pat. No. 4,170,738 to Smith teaches another device, which involves tracks and rollers. U.S. Pat. No. 1,008,682 to Wall teaches a system for pumping air or water in response to waves. The device includes a floating ramp which is connected to a pier for vertical movement in response to changes in water level and a scoop which is supported on rollers embedded in the ramp. In response to a wave, the scoop travels upwardly along the ramp, producing a pumping stroke in a cylinder assembly comprising three piston-type cylinders. Gravity restores the scoop to a lowered position. Although the prior art describes various pumping systems, it does not propose any modification of a breakwater to obtain additional functionality.

BRIEF SUMMARY OF THE INVENTION

In one aspect, the invention provides a breakwater system adapted to pump water from a body of water. A submerged stationary base is fixed to a solid subsurface below the body of water. A breakwater is located in the water and protrudes upwardly through the surface of the water, performing the basic protective functions expected of a breakwater. Means support the breakwater for displacement on the base along a generally horizontal axis. Spring means urge the breakwater to a rest position such that wave action or underwater currents produce a reciprocating movement along the displacement axis. The spring means preferably act between the base and opposing sides of the breakwater so that the rest position is between two horizontally extreme positions of the breakwater, and wave action or underwater currents against either side of the breakwater displace the breakwater. A pump has a water inlet immersed in the water and a water outlet optionally coupled to a reservoir on shore. Means connect the pump to the breakwater such that the reciprocating movement of the breakwater pumps water from the inlet to the outlet of the pump.

The pump preferably has a configuration appropriate for large scale pumping of water. The pump comprises a housing that defines a chamber, and a piston that displaces along a predetermined axis through the chamber. A rod connects the piston to the breakwater so that reciprocating movement of the breakwater causes a corresponding reciprocating displacement of the piston along the axis. A plurality of roller assemblies space the piston from the housing. Each roller assembly comprises an elongate roller mounted to one of the housing and piston for rotation about an axis substantially perpendicular to the displacement axis of the piston. Each roller contacts a flat surface defined by the other of the housing and the piston, the contacted surface being oriented substantially parallel to the piston's displacement axis. The pump housing preferably comprises a removable door that accesses the chamber to permit cleaning or repair. Lock means are preferably provided to lock the breakwater to the base against horizontal displacement to deactivate the pump, permitting such cleaning or repair.

Various aspects of the invention will be apparent from a description below of a preferred embodiment and will be more specifically defined in the appended claims.

DESCRIPTION OF THE DRAWINGS

The invention will be better understood with reference to drawings in which.

DESCRIPTION OF PREFERRED EMBODIMENTS

Figure 1:
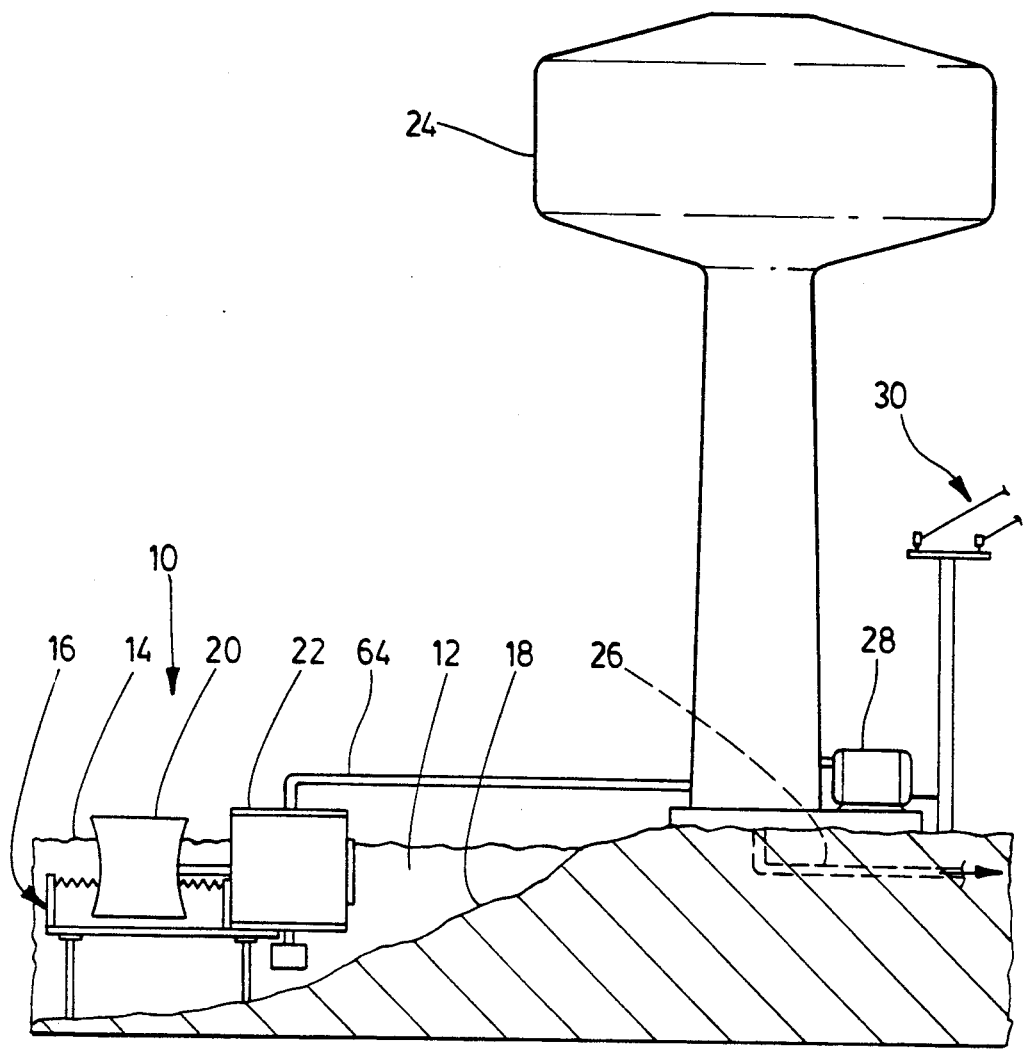
FIG. 1 is a diagrammatic elevational view stripped of detail of a dynamic breakwater system coupled to a water reservoir and optional equipment for generating electricity.
Figure 2:
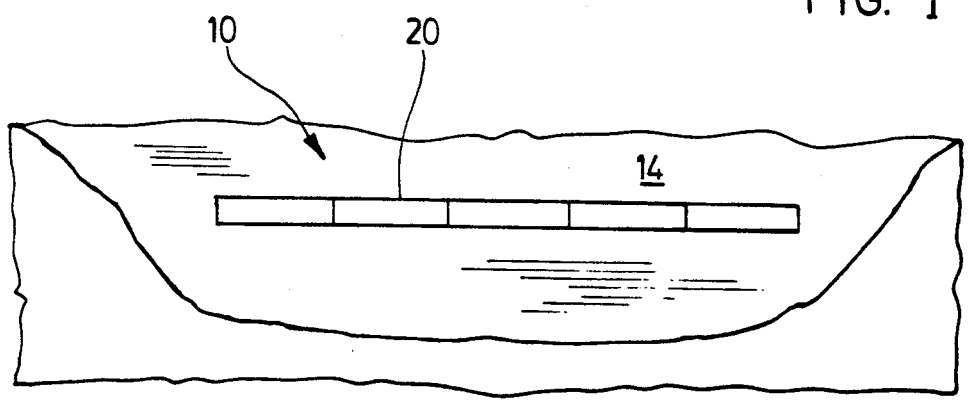
FIG. 2 is a diagrammatic plan view of the breakwater.
Figure 3:
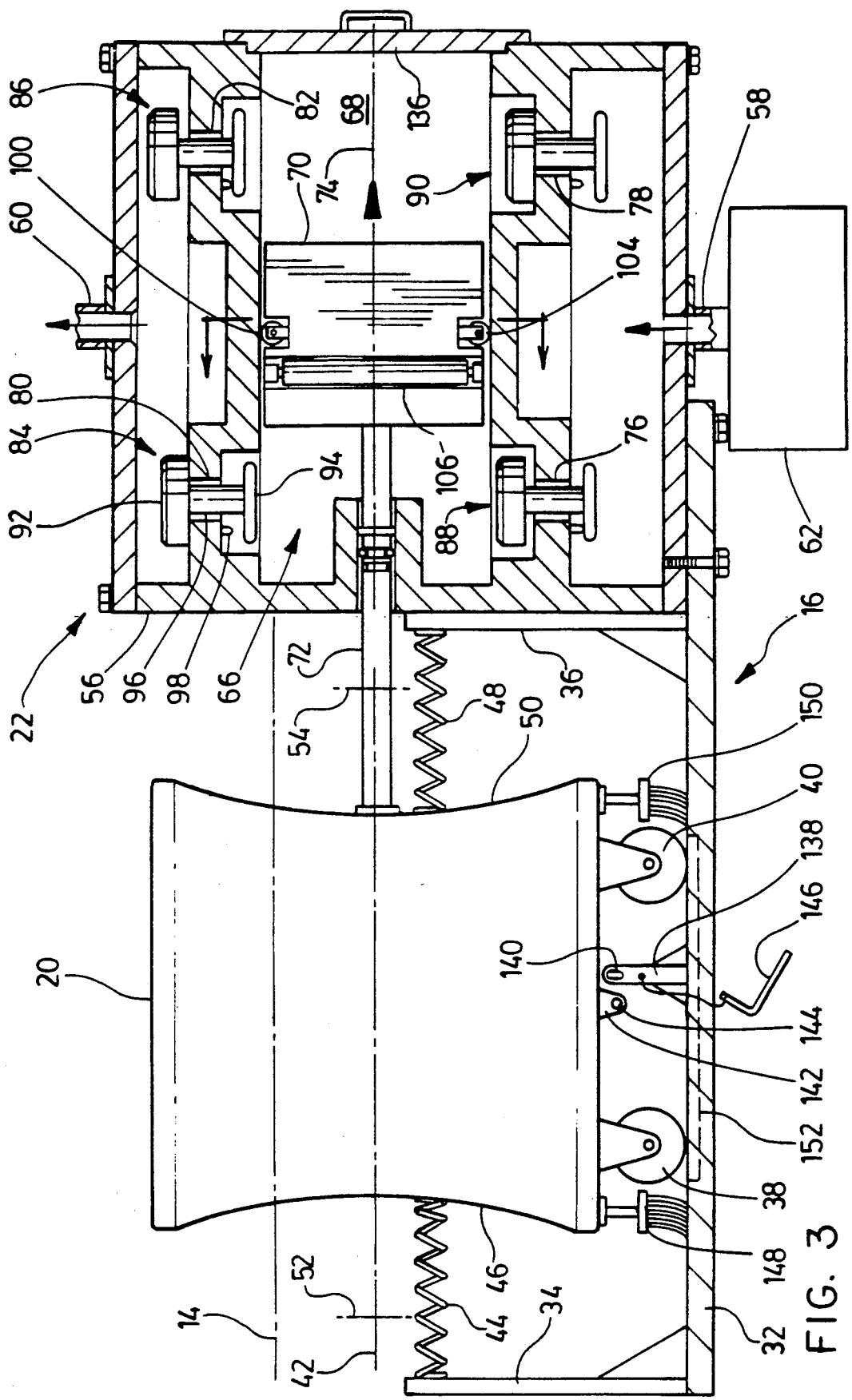
FIG. 3 is a view in partial cross-section further detailing the construction of the breakwater and a pump associated with the breakwater.

Reference is made to FIGS. 1 and 2 which provide a diagrammatic overview of a breakwater system adapted to pump water in response to motion of a body 12 of water. These views are stripped of detail, and various components required by the breakwater system are illustrated in FIG. 3. The system includes a breakwater 10 located offshore in the body 12 of water, partly submerged below the water surface 14 and partly protruding upwardly through the water surface 14. The breakwater 10 is supported on a submerged stationary base 16 fixed to a solid surface 18 underlieing and supporting the body 12 of water. The breakwater 10 is formed in distinct sections, such as the central section 20, that may be joined to displace essentially as a single unitary structure in response to wave action or underwater currents. A pump 22 is operated in response to motion of the breakwater 10 to pump water to a reservoir 24 located on shore. From the reservoir 24, the water can flow along a conduit 26, for example, to a desalination plant (not illustrated), or may alternatively be guided in a conventional manner to conventional generating equipment 28 to produce electric energy that can be transmitted along appropriate transmission lines 30. The construction of the breakwater 10 will be more apparent from FIG. 3 which shows features of the central breakwater section 20, which is typical. The base 16 comprises a horizontal platform 32 and two uprights 34, 36 on opposing sides of the platform 32. These support the breakwater section 20 and loosely guide or constrain its movement. The breakwater section 20 has wheels 38, 40 that support it for displacement on the platform 32 along a generally horizontal axis 42. A spring 44 acts between the left upright 34 and one side 46 of the breakwater section 20, urging the breakwater section 20 in one axial direction (to the right in the view of FIG. 3) along the displacement axis 42. Another spring 48 acts between the other upright 36 and the opposing side 50 of the breakwater section 20, urging the breakwater section 20 horizontally in an opposing axial direction (to the left in FIG. 3). The breakwater section 20 consequently has two horizontally extreme positions 52, 54 and a rest position intermediate the two extreme positions 52, 54. Wave action against either side 46, 50 of the breakwater section 20 produces a reciprocating movement of the breakwater section 20 along the horizontal displacement axis 42. The concave nature of the opposing sides 46, 50 of the breakwater section 20 enhances its response to the impact of waves. The other breakwater sections are similarly configured such that the entirety of the breakwater 10 effective displaces from the rest position indicated toward the two extreme position in response to waves.

The pump 22 comprises a housing 56 which includes a water inlet 58 and a water outlet 60. The water inlet 58 is immersed in the body 12 of water and comprises a screen 62 for separating larger debris from incoming water. The outlet 60 is coupled by a conduit 64 (shown in FIG. 1) to the reservoir 24. The housing 56 defines an internal chamber that is divided into left and right compartments 66, 68 by a large piston 70. The piston 70 is coupled by a rod 72 to the central breakwater section 20 so that reciprocating motion of the breakwater 10 produces a corresponding reciprocating motion of the piston 70 along a horizontal axis 74 through the chamber. A valve mechanism couples the housing inlet 58 and outlet 60 to the chamber so that axial displacement of the piston 70 in either direction pumps water received at the inlet 58 to the outlet 60.

The housing 56 comprises a pair of intake passages 76, 78 that place the housing inlet 58 in communication with the two compartments 66, 68. A left intake passage 76 places the housing inlet 58 in communication with the left compartment 66. A right intake passage 78 places the housing inlet 58 in communication with the right compartment 68. The housing 56 also comprises two discharge passages 80, 82. A left discharge passage 80 places the housing outlet 60 in communication with the left compartment 66 while a right discharge passage 82 places the housing outlet 60 in communication with the right compartment 68.

The valve mechanism comprises a pair of discharge valve members 84, 86 and a pair of intake valve members 88, 90, all of identical construction. Only the left discharge valve member 84 will be described in detail. It has an enlarged head 92 above the left discharge passage 80, a shoulder 94 below the left discharge passage 80, and a neck 96 that extends through the left discharge passage 80. Its head 92 is configured simply to seat over and close the left discharge passage 80, as apparent in the closed orientation shown in FIG. 3. It is biased to that closed orientation by gravity, which is preferred to use of springs. The left discharge valve member 84 displaces upwardly to an open state (not shown) in response to positive pressure in the left compartment 66, allowing water flow from the left compartment 66 through the left discharge passage 80 to the housing outlet 60. A projection 98 confronts the shoulder 94 to prevent it from closing the left discharge passage 80 in response to such upward displacement of the valve member 84. The right discharge valve member 86 is similarly mounted relative to the right discharge passage 82, and is shown displaced to its open orientation in FIG. 3. Such displacement occurs in response to positive pressure in the right compartment 68. Basically, each of the discharge valve members 84, 86 displace to an open orientation in response to positive pressure in the associated compartment 66 or 68 and both otherwise close under gravity.

The intake valve members 88, 90 are also biased by gravity to a closed orientation relative to their respective intake passages 76, 78. Each displaces to an open orientation in response to negative pressure within the associated compartment 66 or 68. The left intake valve member 88 is shown in FIG. 3 in its open orientation, allowing water flow from the housing inlet 58 through the left intake passage 76 to the left compartment 66.

The orientation of the various valve members in FIG. 3 corresponds to displacement of the piston 70 to the right, as indicated by the arrow on the piston displacement axis 74. The right discharge valve member 86 is opened by positive pressure created by the piston 70 in the right compartment 68, allowing water from the right compartment 68 to flow under the pressure through right discharge passage 82 to the housing outlet 60. The left intake valve member 88 is simultaneously opened by negative pressure created by displacement of the piston 70 in the left compartment 66, allowing water to flow from the housing inlet 58 through the left intake passage 76 to the left compartment 66. When the direction of motion of the piston 70 is reversed, the right discharge valve member 86 and the left intake valve member 88 return under gravity to their closed orientations. Positive pressure in the left compartment 66 then opens the left discharge valve member 84 and negative pressure in the right compartment 68 opens the right intake valve member 90. Water flows from the inlet 58 into the right compartment 68 and also from the left compartment 66 to the housing outlet 60. The pump 22 is consequently double-acting. Any displacement of the breakwater 10, either to the left or right along its displacement axis 42, causes water to be pumped from the housing outlet 60.

Figure 5:
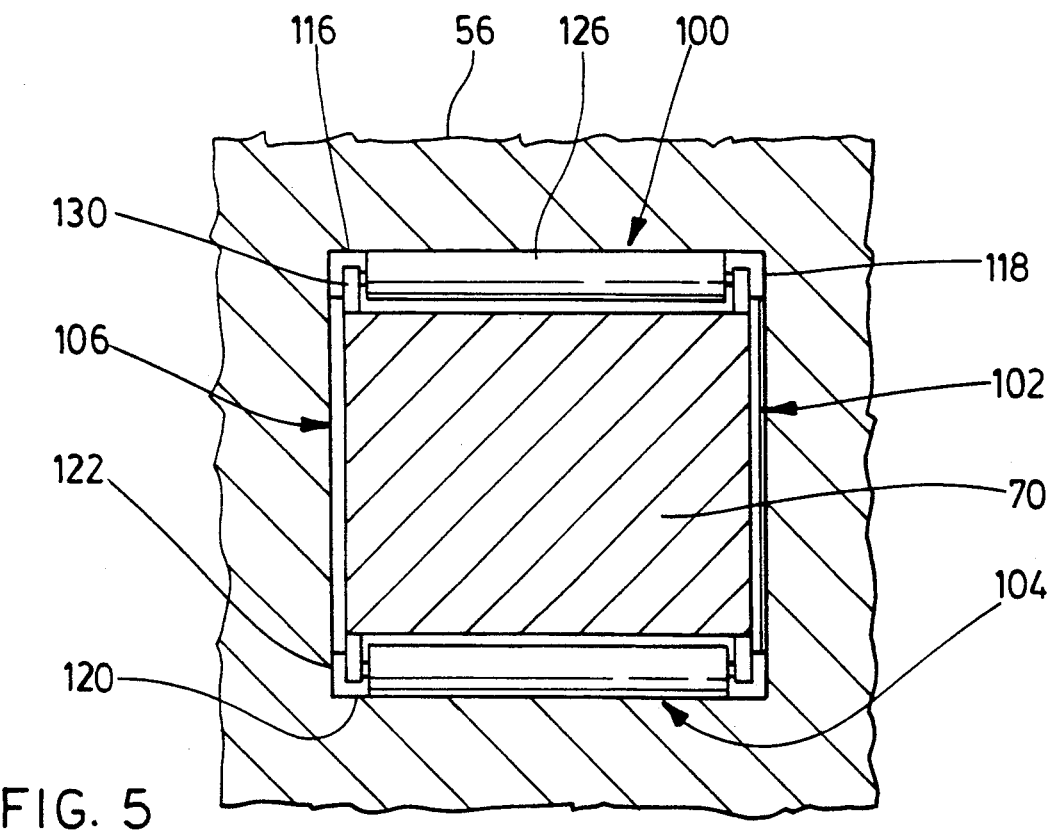

It is desirable to reduce the number of pumps required to take advantage of displacement of the breakwater 10. Use of the single pump 22 (or a small number of pumps) of large capacity reduces construction and installation costs. Lubrication of the pump 22 with oil is not possible. Also, considerable debris may accumulate in the pump 22, despite the presence of the screen 62 at the housing inlet 58, that would potentially impede movement of the large piston 70. To address that problem, the piston 70 carries four roller asemblies 100, 102, 104, 106 that space the piston 70 from the housing walls defining the chamber to facilitate piston displacement. It will be noted in FIG. 5 that the piston 70 has a rectangular cross-section with four substantially flat sides 108, 110, 112, 114. The housing 56 defines four flat surfaces 116, 118, 120, 122 substantially parallel to the displacement axis 74 of the piston 70, together presenting a generally rectangular cross-section and bounding the chamber. Each of the roller assemblies 100, 102, 104, 106 is similarly mounted to a different piston side 108, 110, 112, 114, with its roller engaging a different flat housing surface 116, 118, 120, 122, facilitating displacement of the piston 70.

Figure 4:
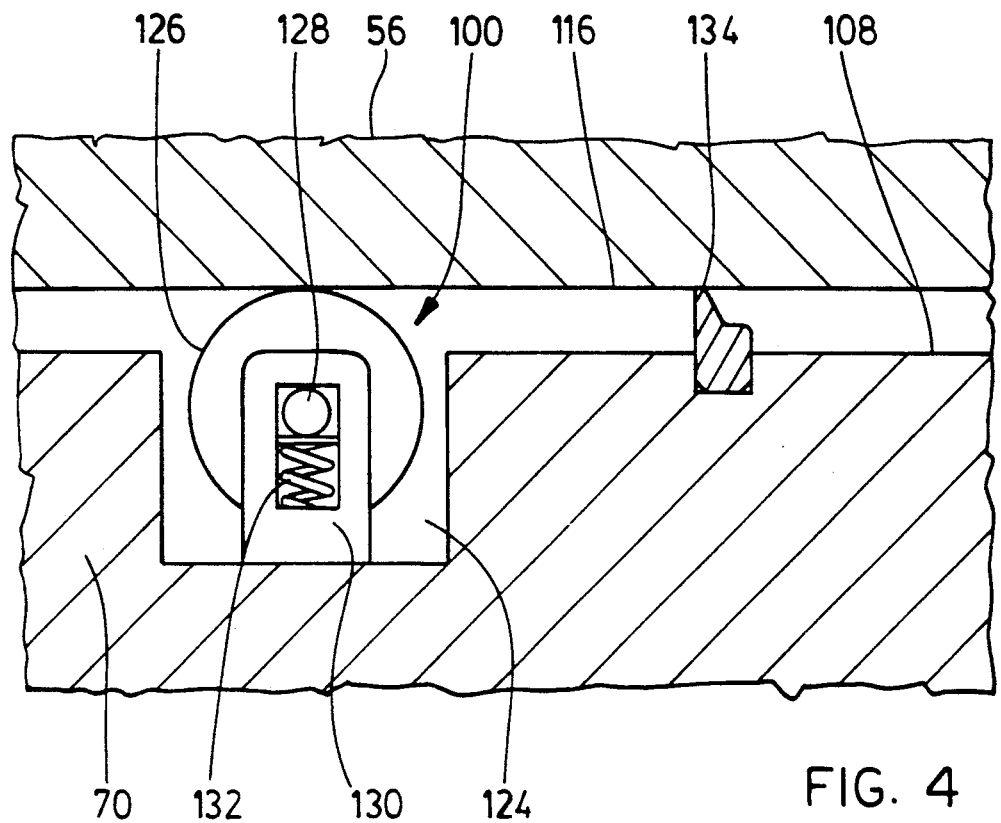
FIG. 4 is an enlarged fragmented view in partial cross-section showing a roller assembly mounted on a piston located within the pump; and, FIG. 5 is a view along lines 5—5 of FIG. 3 showing various roller assemblies spacing the piston from a pump housing.

The roller assembly 100, which is typical, is shown in greater detail in FIG. 4. It is mounted in a recess 124 formed in an upper side 108 of the piston 70. An elongate roller 126 is mounted on an axle 128 for rotation about an axis (not specifically indicated) perpendicular to the displacement axis 74 of the piston 70. A conventional mounting structure 130 supports one end of the axle 128, and a spring 132 biases the axle 128 outwardly, pressing the roller 126 against the housing surface 116. The axle 128 is similarly supported at its opposing end. Appropriate seals may be mounted to the housing 56 and the piston 70, such as the seal 134 mounted to the piston 70 and shown in FIG. 4, to prevent immediate flow of water between the two compartments 66, 68.

The roller assemblies 100, 102, 104, 106 ensure proper displacement of the piston 70, despite absence of conventional lubricants and despite presence of some debris not removed by the screen 62. The housing 56 also carries a door 136 bolted to the body of the housing 56 which can be opened to access the chamber for purposes of cleaning or repair. Pumping action can be arrested with a locking mechanism associated with the breakwater 10. As apparent in FIG. 3, a central upright 138 is attached to the base 16 and has an aperture 140. A lug 142 is attached to the breakwater section 20, and has another aperture 144 which can be aligned with the aperture 140 of the upright 138. An L-shaped key 146 chained to the central upright 138 can be inserted through the apertures 140, 144 when aligned to lock the breakwater 10 to the base 16 against horizontal displacement. The central upright 138 is preferably positioned so that the apertures 140, 144 align when the breakwater section 20 is in its rest position, although that has not been illustrated. Each breakwater section would typically be formed with a comparable locking mechanism.

Debris can also be expected to accumulate on the base 16. This would potentially impede rolling movement of the breakwater section 20 back and forth along its horizontal displacement axis 42. To address that problem, the breakwater section 20 carries brushes 148, 150 that extend lengthwise relative to the breakwater section 20 and contact the upper surface of the platform 32 where debris may rest. The platform 32 is formed with parallel recesses, such as the recess 152 shown in phantom outline, into which the brushes 148, 150 sweep such debris in response to the reciprocating motion of the breakwater 10. The recesses may penetrate fully through the platform 32 to permit debris to fall to the bottom. All breakwater sections are similarly adapted.

It will be appreciated that a particular embodiment of the invention has been described and that modifications may be made therein without departing from the spirit of the invention or necessarily departing from the scope of the appended claims.

I claim:

1. A breakwater system adapted to pump water from a body of water, comprising:
   an underwater stationary base fixed to a solid subsurface supporting the body of water;
   a breakwater located in the body of water and protruding upwardly through a surface of the body of water;
   means supporting the breakwater on the base for displacement along a generally horizontal displacement axis between two horizontally extreme positions;
   spring means acting between the base and opposing sides of the breakwater to urge the breakwater horizontally toward a rest position between the two extreme positions such that wave action against either of the opposing sides of the breakwater produces a reciprocating movement of the breakwater along the displacement axis;
   a pump comprising a water inlet immersed in the water and a water outlet; and,
   means connecting the pump to the breakwater such that the reciprocating movement operates the pump to pump water from the inlet to the outlet.

2. The breakwater system of claim 1 in which the pump comprises:
   a housing defining a chamber, the inlet and the outlet communicating with the chamber;
   a piston displaceable along a predetermined axis through the chamber;
   a rod connecting the piston to the breakwater such that the piston displaces along the predetermined axis in response to the reciprocating movement of the breakwater;
   a plurality of elongate rollers spacing the piston from the housing; and,
   means mounting the rollers to one of the piston and the housing such that each of the rollers rotates about an axis perpendicular to the predetermined axis, the other of the piston and the housing defining a plurality of flat surfaces parallel to the predetermined axis and each contacted by a different one of the rollers.

3. The breakwater system of claim 2 in which the mounting means comprise spring means urging each of the rollers against the flat surface contacted by the roller.

4. The breakwater system of claim 2 comprising lock means for releasably locking the breakwater to the base against displacement along the horizontal axis thereby to deactivate the pump.

5. The breakwater system of claim 4 in which the housing comprises a door accessing the chamber.

6. The breakwater system of claim 1 in which:
   the breakwater comprises a plurality of rolling members;
   the base has an upper surface contacted by the rolling members and formed with a recess; and,
   the breakwater comprises sweeping means contacting the upper surface of base and positioned to sweep debris from the upper surface into the recess in response to the reciprocating movement.

7. The breakwater system of claim 1 in which the pump comprises:
   a housing defining a chamber;
   a piston displaceable along a predetermined axis extending through the chamber;
   a rod connecting the piston to the breakwater such that the reciprocating movement of the breakwater causes a reciprocating displacement of the piston along the predetermined axis; and, valve means coupling the inlet and the outlet to the chamber such that displacement of the piston in either axial direction along the predetermined axis pumps water from the inlet to the outlet.

8. The breakwater system of claim 7 in which:

the piston divides the chamber into a pair of axially spaced-apart compartments;

the housing defines a pair of discharge passages communicating with the pump outlet, one of the pair of discharge passages communicating with one of the pair of compartments, the other of the discharge passages communicating with the other of the pair of compartments;

the housing defines a pair of intake passages communicating with the pump inlet, one of the pair of intake passages communicating with the one compartment, the other of the pair of intake passages communicating with the other compartment;

the valve means comprise a first pair of valve members, each of the first pair of valve members being associated with a different one of the discharge passages, each of the first pair of valve members being oriented for displacement from a closed orientation to an open orientation relative to the associated discharge passage in response to positive pressure in the compartment with which the associated discharge passage communicates; and, the valve means comprise a second pair of valve members, each of the second pair of valve members being associated with a different one of the intake passages, each of the second pair of valve members being oriented for displacement from a closed orientation to an open orientation relative to the associated intake passage in response to negative pressure in the compartment with which the associated intake passage communicates.

9. A system for pumping water in response to motion of a body of water, the system comprising:

a member displaceable within the body of water in response to the motion;

a pump comprising a housing defining a chamber, a water inlet and a water outlet each attached to the housing and communicating with the chamber, a piston located within the chamber and displaceable along a predetermined axis to pump water received at the inlet to the outlet, and valve means coupling the inlet and the outlet to the chamber such that displacement of the piston along the predetermined axis pumps water from the inlet to the outlet;

means connecting the piston to the member such that displacement of the member displaces the piston along the predetermined axis; and, a plurality of roller assemblies spacing the piston from the housing, each of the roller assemblies comprising an elongate roller and means mounting the roller to one of the housing and the piston for rotation about an axis substantially perpendicular to the predetermined axis, each of the rollers contacting a flat surface defined by the other of the housing and the piston and oriented substantially parallel to the predetermined axis.

10. The pumping system of claim 9 in which, in each of the roller assemblies, the mounting means comprise spring means urging the roller against the flat surface contacted by the roller.

11. The pumping system of claim 9 comprising:

a supporting structure guiding movement of the member in response to motion of the body of water; and, lock means for locking the member to the supporting structure against displacement thereby to deactivate the pump.

12. The pumping system of claim 11 in which the pump housing comprises a door accessing the chamber thereby to permit cleaning, maintenance or repair of the chamber.

13. The pumping system of claim 9 in which:

the piston is generally rectangular with four sides;

the housing defines four substantially flat surfaces bounding the chamber; and, each of the roller assemblies is mounted on a different one of the four sides of the piston with its roller contacting a different one of the four substantially flat surfaces of the housing.

14. A breakwater system adapted to pump water from a body of water, comprising:

an underwater stationary base fixed to a solid subsurface supporting the body of water;

a breakwater comprising a portion located below a surface of the body of water and a portion protruding upwardly through the surface;

means supporting the breakwater on the base for displacement along a generally horizontal displacement axis;

spring means connected between the base and the breakwater for urging the breakwater toward a predetermined rest position such that wave action against the breakwater produces a reciprocating movement of the breakwater along the displacement axis to and from the rest position;

a pump comprising a water inlet immersed in the water and a water outlet; and, means connecting the pump to the breakwater such that the reciprocating movement operates the pump to pump water from the inlet to the outlet.

15. The breakwater system of claim 14 in which the pump comprises:

a housing defining a chamber, the water inlet and the water outlet communicating with the chamber;

a piston located within the chamber and displaceable along a predetermined axis to pump water received at the inlet to the outlet;

means connecting the piston to the breakwater such that the reciprocating movement of the breakwater displaces the piston along the predetermined axis; and, valve means coupling the inlet and the outlet to the chamber such that displacement of the piston along the predetermined axis pumps water from the inlet to the outlet; and, a plurality of roller assemblies spacing the piston from the housing, each of the roller assemblies comprising an elongate roller and means mounting the roller to one of the housing and the piston for rotation about an axis substantially perpendicular to the predetermined axis, each of the rollers contacting a flat surface defined by the other of the housing and the piston and oriented substantially parallel to the predetermined axis.

16. The breakwater system of claim 15 comprising lock means for releasably locking the breakwater to the base against displacement along the horizontal axis thereby to deactivate the pump.

17. The breakwater system of claim 16 in which the housing comprises a door accessing the chamber.

* * * * *